United States Patent
Tendyck et al.

(10) Patent No.: US 10,261,593 B2
(45) Date of Patent: Apr. 16, 2019

(54) USER INTERFACE, MEANS OF MOVEMENT, AND METHODS FOR RECOGNIZING A USER'S HAND

(71) Applicant: VOLKSWAGEN AKTIENGESELLSCHAFT, Wolfsburg (DE)

(72) Inventors: Christian Tendyck, Berlin (DE); Wolfgang Theimer, Bochum (DE); Gordon Larson, Bochum (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 66 days.

(21) Appl. No.: 15/487,373

(22) Filed: Apr. 13, 2017

(65) Prior Publication Data

US 2017/0300120 A1   Oct. 19, 2017

(30) Foreign Application Priority Data

Apr. 13, 2016   (DE) .......................... 10 2016 206 142

(51) Int. Cl.
*G06F 3/01*   (2006.01)
*G06K 9/00*   (2006.01)
(Continued)

(52) U.S. Cl.
CPC .............. *G06F 3/017* (2013.01); *B60R 1/00* (2013.01); *G06K 9/00375* (2013.01);
(Continued)

(58) Field of Classification Search
CPC . G06F 3/017; G06F 3/01; G06F 3/005; G06F 3/00; G06F 3/011; G06K 9/00375;
(Continued)

(56) References Cited

U.S. PATENT DOCUMENTS

2002/0090146 A1   7/2002   Heger et al.
2012/0200494 A1*  8/2012   Perski ..................... G06F 3/017
                                                   345/156
(Continued)

FOREIGN PATENT DOCUMENTS

CN   107589850 A   *  1/2018
DE   19516662        11/1996
(Continued)

OTHER PUBLICATIONS

German Patent Appln. No. 102016206142.9. Office Action (dated Nov. 17, 2016).
(Continued)

*Primary Examiner* — Julie Anne Watko
(74) *Attorney, Agent, or Firm* — Loza & Loza, LLP; Peter Zura

(57) ABSTRACT

A hand of a user may be detected in free space, where a plurality of surface points are determined and include a center area surface point and at least two surface points of the plurality of surface points located on a periphery of the surface of the hand. A curve extending through the plurality of surface points may be determined based on a position of a curvature. The plurality of surface points are processed to determine if the plurality of surface points of the detected hand are arranged in at least one of a substantially concave area relative to the sensor, and/or a substantially convex area relative to the sensor. The detected hand may be identified as a palm or back of the hand based on the processing of the plurality of surface points.

19 Claims, 1 Drawing Sheet

(51) Int. Cl.
*B60R 1/00* (2006.01)
*G06F 3/00* (2006.01)

(52) U.S. Cl.
CPC .... *G06K 9/00382* (2013.01); *B60K 2350/106* (2013.01); *B60K 2350/1052* (2013.01); *B60K 2350/2013* (2013.01); *B60R 2300/103* (2013.01); *B60R 2300/107* (2013.01); *B60R 2300/108* (2013.01); *G06F 3/005* (2013.01); *G06K 9/00389* (2013.01)

(58) Field of Classification Search
CPC ........... G06K 9/00382; G06K 9/00389; G06K 9/00935; G06K 9/00362; G06K 9/00355; G06K 9/00006; G06K 9/00; G06K 9/00033; G06K 2009/00395; B60R 1/00; B60R 2300/017; B60R 2300/10; B60R 2300/00; B60R 2300/108; B60R 2300/106; B60R 2300/103; B60K 2350/1052; B60K 2350/1008; B60K 2350/1004; B60K 2350/10; B60K 2350/00; B60K 2350/106; B60K 2350/1056; B60K 2350/2013; B60K 2350/20

See application file for complete search history.

(56) References Cited

U.S. PATENT DOCUMENTS

| | | | |
|---|---|---|---|
| 2014/0191927 A1* | 7/2014 | Cho | G02B 27/017 345/8 |
| 2015/0022432 A1* | 1/2015 | Stewart | G06F 3/04842 345/156 |
| 2015/0370321 A1 | 12/2015 | Lundberg | |
| 2016/0004907 A1* | 1/2016 | Lundberg | G06K 9/48 348/53 |
| 2017/0329458 A1* | 11/2017 | Kanemaru | G06F 3/0425 |

FOREIGN PATENT DOCUMENTS

| | | |
|---|---|---|
| DE | 10100615 | 7/2002 |
| KR | 20140123900 A | 10/2014 |
| WO | WO2014128749 A1 | 8/2014 |

OTHER PUBLICATIONS

Korean Patent Appln. No. 10-2017-0047921. Office Action (dated Jul. 20, 2017).

* cited by examiner

USER INTERFACE, MEANS OF MOVEMENT, AND METHODS FOR RECOGNIZING A USER'S HAND

RELATED APPLICATIONS

The present application claims priority under 35 U.S.C. § 119 to German patent application DE 10 2016 206 142.9, filed Apr. 13, 2016 to Tendyk et al., the contents of which is incorporated by reference in its entirety herein.

TECHNICAL FIELD

The present disclosure relates to a processor-based system, vehicle, user interface and method for recognizing a hand of a user. In particular, the present disclosure relates to detecting differences between a front side and a back side and/or a left and a right hand of a user.

BACKGROUND

For many user interfaces, it is important to distinguish if a left hand or a right hand is used to provide the input. In a driver's cab, for example, it is important to differentiate an operation that is performed by the driver from that performed by the passenger. While the driver is prohibited (and/or restricted) from using the interface while driving the passenger can access/operate features that have been assigned to him or her without restriction. Customarily used sensors do not have a great detection range and are therefore unable to distinguish if a hand is approaching from the direction of the driver's seat or from the direction of the front passenger seat. Correspondingly, this is the reason why a distinction between a left and a right hand is only possible when the hand is already in close proximity of the middle console. An alternative user application is captured in the gesture-based climate control of the heating/cooling system of a vehicle. Upon recognizing the driver's right hand, the system responds by allowing the driver to influence the set temperature and fan speed; these settings are adjusted correspondingly from the front passenger's side in response to the system recognizing the left hand of the front seat passenger. The aforementioned user applications can also be applied to features such as the adjustment of seat positions, lighting options, window lifters, etc.

DE 10 2013 010 932 B4 discloses a gesture-based user interface that includes a time-of-flight (ToF) camera as its sensor. The image data generated in this manner represent three-dimensional information containing spatial coordinates of individual two-dimensional sections of the at least one gesticulating arm.

DE 20 2015 100 273 U1 discloses an input device for 3D gesture recognition that distinguishes via a camera-based sensor means between a swiping gesture and a return motion of the hand of a user.

DE 10 2014 004 675 A1 discloses a gesture evaluation system that uses a ToF camera as a means for executing evaluation processes (for example, regarding the replay of a piece of music) by means of recognizing a hand position ("thumbs-up" gesture).

DE 195 16 662 A1 discloses an apparatus for identifying three-dimensional objects and persons that envisions surface detection of inanimate objects and persons by sensor means. The three-dimensional shape of a body is proposed as a reliable identifying feature.

DE 101 00 615 A1 discloses a hand recognition system with positioning that provides for comparing the ratio of the size of a volume/area relative to a surface/length of the border line. Based on a comparison of the ratio with threshold values, the palm of the hand is thus distinguished from the fingers and/or an arm of the user.

Based on the previously described prior art, the present disclosure provides, among other things, a robust differentiation between a forehand and a backhand of a user's hand that is utilized for providing gesture inputs.

BRIEF DESCRIPTION OF THE DRAWINGS

Based on the figures in the enclosed drawings, embodiments of the present invention will be described below in further detail. The drawings show as follows.

DETAILED DESCRIPTION

Figure 1:
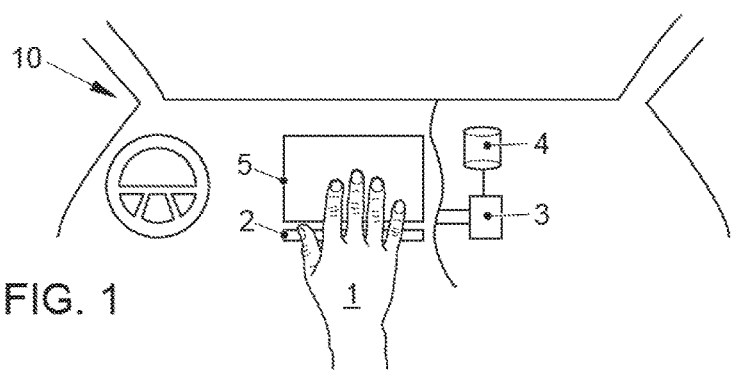
FIG. 1 is a schematic view of a driver's cab inside a vehicle having a user interface according to an illustrative embodiment.

According to illustrative embodiments, a hand of a user may be detected by a sensor. This can be achieved while a three-dimensional gesture is performed freely in space. The sensor may determine surface points of the palm and/or hand of the user. The surface points can be understood at least as support points in the context of a scanning result that represents the surface of the hand. The relative positions (for example, relative to a predefined middle plane through the palm or parallel to the same) of these surface points are then determined. For example, it is possible to determine the respective distances from the surface points to the sensor. This way, it is possible to ascertain, seen from the sensor's perspective, if the surface points are arranged on a surface having a concave or a convex curvature. If the surface points are substantially located inside a concave area, the system recognizes a palm that is directed toward the sensor. This means that the back of the hand is oriented away from the sensor. In other words, the sensor is in a palmar position. If the surface points are substantially located inside a convex area, the system recognizes that the back of the hand is directed toward the sensor. In other words, the sensor is in a dorsal position. This can give a user interface the capability of distinguishing whether a hand that operates the user interface is allocated to a first user (for example, a driver) or a second user (for example, a front seat passenger).

In some illustrative embodiments, the sensor for detecting the hand of the user can be provided, for example, in a middle console, a dashboard or a roof liner; naturally, combinations of the aforementioned positions and/or the combined use of several of them at least in one of the aforementioned positions are also possible. A preferred position for the placement of the detection sensor (for example, a ToF camera) is for ergonomic reasons, in particular, inside the roof liner or the inside mirror envisioning a camera that is pointed in a downward direction or incorporated in the middle console with a camera that is pointed in an upward direction, since holding a hand substantially horizontally is ergonomically more expedient than holding the same substantially vertically.

Preferably, it can be recognized that the plurality of surface points are located on the area of the hand, such as the palm. Of course, other surface points, such as areas on the finders of a hand may also be utilized by a sensor. The latter configuration may also be incorporated in the distinction according to the present disclosure between convex and concave surfaces of a collection or cloud (i.e., a plurality) of surface points. However, limiting the recognition operation to the palm of the hand in some configurations may provide prevention against false recognition events because overstretching the palm (resulting in a change from a concave surface to a convex surface) as opposed to overstretching of the entire hand is considerably more difficult, if not impossible.

In some illustrative embodiments, a position of the thumb of the hand of the user can be determined. For example, it is possible to establish a relative length and/or size of the extremities (finger and thumb) of the hand and/or their distances relative to each other. Subsequently, using a function of the position of the thumb in connection with the orientation of the hand, it is then possible to recognize automatically if the involved hand is a left hand or a right hand. This can yield valuable information about whether a first user (for example, a driver) or a second user (for example, a passenger) operates the user interface.

The thumb position can preferably be recognized by assessing the radius of a shape of surface points delimiting the hand. In other words, the perimeter of the hand can be processed and detected with regard to convex border areas to ascertain the positions of where the thumb and/or the fingers of the hand are arranged. Correspondingly, it is also possible to localize the intermediate spaces between fingers using their concave hand perimeter sections.

The detection regarding the hand orientation according to the present disclosure can be conceptualized in an especially simple manner and without great computational effort by using a particularly small number of surface points from the plurality of surface points for the detection under some illustrative embodiments. For example, a surface point that is located substantially in the center of the palm can be considered together with two surface points located on the periphery of the hand. The two surface points that are located on the periphery of the hand area are preferably located substantially opposite of each other relative to the surface point in the center. An initial estimation of the concavity or convexity, respectively, of the area that is defined by the surface points can now be achieved by determining whether the three points describe, seen from the perspective of the sensor, a convex or a concave curvature and/or are located on the same. This way, an analysis of the totality of the plurality of surface points and any associated computing complexity are no longer necessary. Proceeding in this manner allows, in particular, for arriving at a quick (initial) estimation of the orientation of the hand of the user.

In some illustrative embodiments, a processor-based method may be executed for determining an equalization plane that is arranged as a reference through the plurality of surface points for determining the concave and/or convex area(s). An averaged plane is determined based on the surface points of the hand, then the respective positions of the actual surface points are classified relative to the plane. Using the positions of the surface points that are classified as "in front of" and/or "behind" the equalization plane, it is possible to establish the hand area as convex and/or concave and determine based thereupon—as described herein—the orientation of the hand area relative to the used sensor.

The sensor can comprise, for example, a stereo camera, an infrared sensor and/or a time-of-flight (ToF) camera. Using the aforementioned sensors, it is possible to arrive at an estimation of the distance of the respective surface points that are instrumental in characterizing the orientation of the hand surface that is directed toward the sensor.

In some illustrative embodiments, the plurality of surface points for the recognition can be limited to such data that describe the surface areas of the hand of the user. In other words, a hand position and/or hand orientation for the recognition action according to the present disclosure can be omitted. Accordingly, it is possible to use a very compact detection area for the used sensor and high resolution within the same.

According to some illustrative embodiments, a user interface for a vehicle may be utilized. The user interface can be set up such that it can be used in a wireless communications device and/or a mobile user end device (for example, a tablet, smartphone, and the like). The user interface may comprise a sensor that can be configured, for example, as a camera, infrared sensor, time-of-flight camera, and the like. The camera can also be suitable, for example, for video telephony and photography applications, and the like. An analyzer (for example, a programmable processor, an electronic controller, and the like) can also be used for task packs and computing operations that are outside of the scope of the present invention. The sensor is set up for detecting the hand of the user by sensor means. The analyzer is set up to determine a plurality of surface points of the hand and/or the palm of the hand in the sensor signal. The surface points can be classified in such a manner, for example, that points located on the periphery of the palm, extreme points of the fingers and surface points arranged in the center of the palm are differentiated. In particular, a pairwise assignment of the points located on the periphery of the palm and/or on the fingers relative to the center of the palm can be achieved in that the pairs of surface points are located opposite each other relative to the center point. For example, the point cloud of surface points can be associated with a respective distance value that can be used as a basis for describing the shape of the hand area that is directed toward the sensor.

In some illustrative embodiments, when the surface points are arranged substantially in a concave manner relative to each other, the analyzer now recognizes an inside area of the hand that is directed toward the sensor. Vice versa, a back of a hand that is directed toward the sensor is recognized when the surface points are arranged substantially in a convex manner relative to each other. Accordingly, the user interface according to the invention is set up for implementing the features, feature combinations and the resulting advantages of the method according to the invention, wherefore we refer to the remarks above to avoid repetitiveness.

In some illustrative embodiments, a computer program product (for example, a data storage) is disclosed that stores instructions for enabling a programmable processor to execute the steps of a method according to the aspect of the invention mentioned first. The computer program product can be designed, for example, as a CD, DVD, Blue-Ray disc, flash memory, hard drive, RAM/ROM cache, etc.

In some illustrative embodiments, a vehicle (for example, a passenger car, van, truck, motorcycle, aircraft and/or watercraft) is disclosed that comprises a user interface according to illustrative embodiments disclosed herein. The user interface may be configured for the driver of the vehicle by means of which the driver can communicate with the vehicle and the technical systems of the same while driving the vehicle.

FIG. 1 shows a driver's cab of a vehicle 10 with a monitor that serves as a display unit of a user interface disposed inside the dashboard under an illustrative embodiment. In this example, an infrared LED bar 2 is provided below the monitor 5 that for detecting gestures performed freely in space (3D gestures) by the hand 1 of a user. Both the monitor 5 and the infrared LED bar 2 are connected by IT means to an electronic controller 3 serving as an analyzer, which is in turn connected by IT means to a data storage 4. The instructions for executing the steps of the method according to the present disclosure are stored in the data storage 4.

Figure 2:
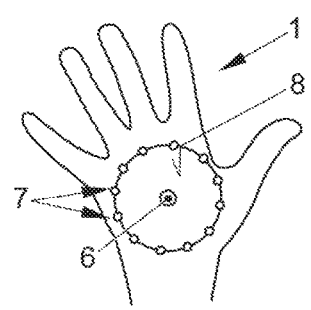
FIG. 2 is a representation of a hand of a user including a visualization of a plurality of surface points.

FIG. 2 shows a right hand 1 of a user whose palm 8 is directed toward the observer. In this embodiment, a plurality of points 7 is arranged substantially in a circular shape around a virtual center 6 of the hand 1. The center 6 is a component of the plurality of the surface points. According to an illustrative embodiment, seen from the perspective of the observer, the concave surface of the palm is a characteristic for the orientation of the hand 1. Since the plurality of surface points 7 is located on average in closer proximity to the observer than to the center 6, the fact that palm 8 is directed toward the observer can also be determined by sensory and computing means, simply by analyzing the relative positions of the surface points 6, 7.

For example, two surface points 7 that are located opposite each other relative to the center 6 can be processed to determine if an imaginative straight line between them is in front of or behind the center 6. If the center 6 is located in the direction of the observer, meaning in front of the imaginative straight line, the palm 8 is directed away from the observer, and the apparatus recognizes the back of the hand. However, if—as depicted—the palm 8 is directed towards the observer, the center surface point 6 is arranged behind the imaginative line of the surface points 7. Alternatively or additionally, a center plane that is placed through the surface points 7 or all surface points 6, 7 can be processed to determine whether the center surface point 6 is located in front of or behind the plane. The analysis regarding the orientation of palm 8 is achieved correspondingly.

Figure 3:
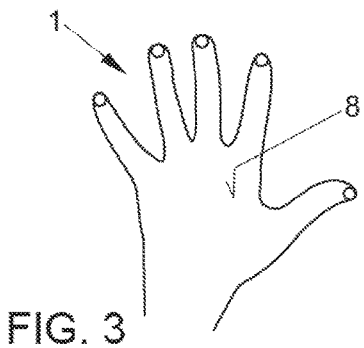
FIG. 3 is a representation of a hand of a user with, based on a radius-type perspective, localized fingers and a thumb that are optically highlighted.

FIG. 3 shows the optically highlighted tips of the fingers and of the thumb of the right hand 1 of a user. These areas are characterized by a convex border line and sections with especially strong curvature (small radius). The relative position of the finger tips and the tip of the thumb relative to each other reveals the exposed position of the thumb. Based on the knowledge as explained in connection with FIG. 2, whereby the palm 8 is oriented in the direction toward the observer, it now possible to determine that this is a right hand (in vehicle applications, this hand must usually be assigned to the driver).

Figure 4:
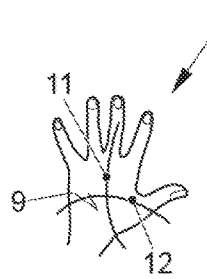
FIG. 4 is a representation of the back of a left hand.

FIG. 4 shows a left hand 1 of a user with the back of the hand 9 directed toward the observer. Seen from the perspective of the observer, convex orientation lines 11, 12 characterize the curve of the surface of the back of the hand 9. The depicted surface curve can be detected and analyzed by sensory and/or IT means to determine the orientation of the hand 1 according to an illustrative embodiment.

Figure 5:
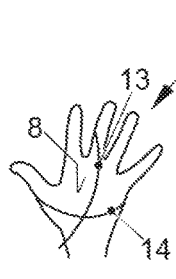
FIG. 5 is a representation of the palm of a left hand.

FIG. 5 shows a left hand 1 of a user whose palm 8 is directed toward the observer. Seen from the perspective of the observer, concave orientation lines 13, 14 characterize the curve of the surface of the palm 8. The depicted surface curve can be detected and analyzed by sensory and/or IT means to determine the orientation of the hand 1 according to an illustrative embodiment.

Figure 6:
FIG. 6 is a representation of the back of a right hand.

FIG. 6 shows a right hand 1 of a user whose back of the hand 9 is directed toward the observer. Seen from the perspective of the observer, convex orientation line 11, 12 illustrate the curve of the surface for the back of the hand 9. The depicted surface curve can be detected and analyzed by sensory and/or IT means to determine the orientation of the hand 1 according to an illustrative embodiment.

Figure 7:
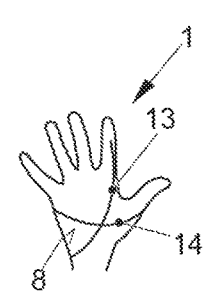
FIG. 7 is a representation of the palm of a right hand.

FIG. 7 shows a right hand 1 of a user whose palm 8 is directed toward the observer. Seen from the perspective of the observer, concave orientation lines 13, 14 illustrate the curve of the surface of the palm 8. The depicted surface curve can be detected and analyzed by sensory and/or IT means to determine the orientation of the hand 1 means according to an illustrative embodiment.

Figure 8:
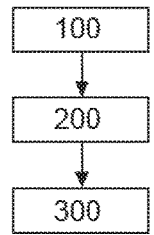
FIG. 8 is a flow diagram that illustrates the steps of a method according to an illustrative embodiment.

FIG. 8 shows the steps involved in a method according to an illustrative embodiment for recognizing a hand of a user. In step 100, the hand of a user is detected by means of a sensor. The sensor can comprise, for example, a stereo camera, an infrared sensor or a fight-to-flight camera. The sensor can be provided in the user interface. The user interface can be provided for a mobile user device (for example, a wireless communications device) or for a vehicle. Step 200 envisions identifying (determining) a plurality of surface points of the hand in the sensor signal. The surface points can be associated with the entire hand or the palm of the hand. In step 300, a palm that is directed toward the sensor is recognized, when the surface points are located substantially in a concave area relative to the sensor. The orientation of the palm of the hand (and/or the back of the hand) provides modern user interfaces that support three-dimensional gesture operation and/or touch input with an additional indicator concerning which hand (left or right) is used for the current operation. Regarding user interfaces that are intended to respond differently to a left hand (for example, of a front seat passenger) than to a right hand (for example, of a driver), the present disclosure thus allows for a particularly safe activation of the features that are available to the user.

Though the aspects and advantageous embodied designs have been described in detail in the context of the embodiments as reflected in the enclosed figures in the drawings, a person skilled in the art will be able to devise further modifications and feature combinations beyond those depicted in the embodiments without exceeding the scope of the invention as specified by the enclosed claims.

LIST OF REFERENCE SIGNS

1 Hand
2 Sensor
3 Analyzer
4 Data storage
5 Monitor
6 Surface point (center of the hand)
7 Surface point (periphery of the palm of the hand)
8 Palm of the hand
9 Back of the hand
10 Passenger car
11, 12 Convex orientation lines
13, 14 Concave orientation lines
100-300 Method steps

The invention claimed is:
1. A system for detecting a hand orientation, comprising:
a sensor for detecting a hand of a user in free space;
a processing apparatus, operatively coupled to the sensor, the processing apparatus being configured to
detect a plurality of surface points of the detected hand;

process the plurality of surface points to determine if the plurality of surface points of the detected hand are arranged in at least one of a substantially concave area relative to the sensor, and/or a substantially convex area relative to the sensor;
identify the detected hand as a palm of the hand directed towards the sensor if the processing apparatus determines the plurality of surface points of the detected hand are arranged in a substantially concave area relative to the sensor; and
identify the detected hand as a back of the hand directed towards the sensor if the processing apparatus determines the plurality of surface points of the detected hand are arranged in a substantially convex area relative to the sensor.

2. The system according to claim 1, wherein the processing apparatus is configured to:
determine a position of a thumb on the hand; and
identify if the hand is a left hand or a right hand in response to determining the position of the thumb on the hand.

3. The system according to claim 2, wherein the position of the thumb is determined by the processing apparatus using at least one of a radius and/or size assessment of a shape of the surface points of the hand.

4. The system according to claim 1, wherein the processing apparatus is configured to:
determine a surface point from the plurality of surface points located in a center area of the surface of the hand; and
determine at least two other of the surface points of the plurality of surface points located on a periphery of the surface of the hand.

5. The system according to claim 4, wherein the processing apparatus is further configured to determine a curve extending through the surface point located in the surface area to the at least two other of the surface points, based on a position of a curvature.

6. The system according to claim 1, wherein the processing apparatus is further configured to determine an equalization plane placed through the plurality of surface points of the hand as a reference for identifying the at least one of the substantially concave and/or convex area(s).

7. The system according to claim 1, wherein the sensor comprises one of a stereo-camera, an infrared sensor, and a time-of-flight camera.

8. A method for detecting a hand orientation, comprising:
detecting, via a sensor, a hand of a user in free space;
determining, via a processor, a plurality of surface points of the detected hand;
processing, via the processor, the plurality of surface points to determine if the plurality of surface points of the detected hand are arranged in at least one of a substantially concave area relative to the sensor, and/or a substantially convex area relative to the sensor;
identifying, via the processor, the detected hand as a palm of the hand directed towards the sensor if the processor determined the plurality of surface points of the detected hand are arranged in a substantially concave area relative to the sensor; and
identifying, via the processor, the detected hand as a back of the hand directed towards the sensor if the processor determined the plurality of surface points of the detected hand are arranged in a substantially convex area relative to the sensor.

9. The method according to claim 8, further comprising:
determining, via the processor, a position of a thumb on the hand; and
identifying, via the processor, if the hand is a left hand or a right hand in response to determining the position of the thumb on the hand.

10. The method according to claim 9, wherein the position of the thumb is determined using at least one of a radius and/or size assessment of a shape of the surface points of the hand.

11. The method according to claim 8, wherein processing the plurality of surface points comprises:
determining, via the processor, a surface point from the plurality of surface points located in a center area of the surface of the hand; and
determining, via the processor, at least two other of the surface points of the plurality of surface points located on a periphery of the surface of the hand.

12. The method according to claim 11, further comprising determining, via the processor, a curve extending through the surface point located in the surface area to the at least two other of the surface points, based on a position of a curvature.

13. The method according to claim 8, further comprising determining, via the processor, an equalization plane placed through the plurality of surface points of the hand as a reference for identifying the concave and/or convex area(s).

14. The method according to claim 8, wherein the sensor comprises one of a stereo-camera, an infrared sensor, and a time-of-flight camera.

15. A method for detecting a hand orientation, comprising:
detecting, via a sensor, a hand of a user in free space;
determining, via a processor, a plurality of surface points of the detected hand, the surface points comprising a center area surface point and at least two surface points of the plurality of surface points located on a periphery of the surface of the hand;
determining, via the processor, a curve extending through the plurality of surface points, based on a position of a curvature;
processing, via the processor, the plurality of surface points to determine if the plurality of surface points of the detected hand are arranged in at least one of a substantially concave area relative to the sensor, and/or a substantially convex area relative to the sensor;
identifying, via the processor, the detected hand as a palm of the hand directed towards the sensor if the processor determined the plurality of surface points of the detected hand are arranged in a substantially concave area relative to the sensor; and
identifying, via the processor, the detected hand as a back of the hand directed towards the sensor if the processor determined the plurality of surface points of the detected hand are arranged in a substantially convex area relative to the sensor.

16. The method according to claim 15, further comprising:
determining, via the processor, a position of a thumb on the hand; and
identifying, via the processor, if the hand is a left hand or a right hand in response to determining the position of the thumb on the hand.

17. The method according to claim 16, wherein the position of the thumb is determined using at least one of a radius and/or size assessment of a shape of the surface points of the hand.

18. The method according to claim 15, further comprising determining, via the processor, an equalization plane placed through the plurality of surface points of the hand as a reference for identifying the at least one of the substantially concave and/or convex area(s).

19. The method according to claim 15, wherein the sensor comprises one of a stereo-camera, an infrared sensor, and a time-of-flight camera.

* * * * *